(12) United States Patent
Jennings et al.

(10) Patent No.: US 8,330,088 B2
(45) Date of Patent: Dec. 11, 2012

(54) TARGET SCENE GENERATOR HAVING A RECONFIGURABLE OPTICAL WAVEGUIDE NETWORK FOR TESTING PULSED LASER SENSING APPARATUS

(75) Inventors: Martyn Robert Jennings, Bristol (GB); Lee Douglas Miller, Portishead (GB)

(73) Assignee: MBDA UK Limited, Hertfordshire (GB)

( * ) Notice: Subject to any disclaimer, the term of this patent is extended or adjusted under 35 U.S.C. 154(b) by 440 days.

(21) Appl. No.: 12/670,301

(22) PCT Filed: Nov. 10, 2009

(86) PCT No.: PCT/GB2009/051501
§ 371 (c)(1),
(2), (4) Date: Jan. 22, 2010

(87) PCT Pub. No.: WO2010/058194
PCT Pub. Date: May 27, 2010

(65) Prior Publication Data
US 2011/0019154 A1    Jan. 27, 2011

(30) Foreign Application Priority Data

Nov. 20, 2008   (EP) .................................... 08253785
Nov. 20, 2008   (GB) ................................... 0821198.9

(51) Int. Cl.
*G01C 21/02*   (2006.01)
(52) U.S. Cl. ...................... 250/203.1; 250/216
(58) Field of Classification Search ............... 250/203.1, 250/203.2, 203.6, 214 R, 216, 208.1, 206.2; 356/4.01–5.05, 28, 139.08, 141.3, 153; 398/121–125
See application file for complete search history.

(56) References Cited

U.S. PATENT DOCUMENTS

| | | | |
|---|---|---|---|
| 4,121,890 A | 10/1978 | Braun | |
| 5,009,502 A | * 4/1991 | Shih et al. | 356/152.1 |
| 5,281,813 A | 1/1994 | Shih | |
| 5,282,014 A | 1/1994 | Ruhl, Jr. et al. | |
| 5,606,409 A | 2/1997 | Schneiter | |
| 7,068,424 B1 | 6/2006 | Jennings et al. | |

FOREIGN PATENT DOCUMENTS

DE   39 35 683 CI   4/1991
GB    2 112 241 A   7/1983

OTHER PUBLICATIONS

Smith, J.L., "Concepts Using Optical MEMS array for LADAR Scene Projection", Proceedings of SPIE, 2003, pp. 276-287, vol. 5092.
Kim, J. H. et al., "Current Efforts on Developing a HWIL Synthetic Environment for LADAR Sensor Testin at AMRDEC", Proceedings of SIE, 2005, pp. 124-132, vol. 5785.
International Preliminary Report on Patentability and Written Opinion dated May 24, 2011 from related application PCT/GB2009/051501.

* cited by examiner

*Primary Examiner* — Que T Le
(74) *Attorney, Agent, or Firm* — Scully, Scott, Murphy & Presser, PC

(57) ABSTRACT

A target scene generator for testing an imaging ladar in a Hard Ware in the Loop arrangement, such as might be employed for testing an optical seeker on a guided missile, the generator comprising an array of pixel elements, a photodetector for detecting incident light from a ladar a laser source for generating pulses of light representing returned ladar pulses, and a reconfigurable fiber network including an optical switch selectively coupling the laser to the pixel elements, and a controller which selectively reconfigures the fiber network, to present to selected pixel elements the pulses of light with selected time delay characteristics such that light emitted from the pixels represent light returned from a target illuminated by the ladar.

23 Claims, 2 Drawing Sheets

TARGET SCENE GENERATOR HAVING A RECONFIGURABLE OPTICAL WAVEGUIDE NETWORK FOR TESTING PULSED LASER SENSING APPARATUS

FIELD OF THE INVENTION

The present invention relates to a target scene generator, for use in testing pulsed laser sensing apparatus that may be incorporated into flying objects such as missiles.

BACKGROUND ART

It is common to incorporate seekers into missiles, for guiding the missile onto a target. When a new missile is being developed it must be tested to ensure that the design is robust and that it behaves the way it is expected to. Tests are carried out at all stages of development on the components and sub-systems, but a test is needed for the complete, assembled missile, in order to check that the sub-systems work together as intended, and that the missile is capable of doing the job it is required to do. The missile sub-systems can be tested simultaneously in a representative environment by firing the missile against a test target at a missile firing range. This is an essential part of any new missile development programme, although it is very expensive and time consuming. A way of significantly reducing the number of missile firings required is to use validated representative performance models. Hardware In The Loop (HWIL) testing allows the interaction and response of many of the missile sub-systems to be tested repeatedly in a controlled environment, at much lower cost and with much faster timescales than firing trials, to provide confidence in both the models and the missile sub-systems.

Guided missiles contain a seeker for autonomous target tracking and interception. The seeker contains a detector that responds to electromagnetic radiation, either RF, optical or infrared, that is emitted or scattered by the target. Target radiation detected by the seeker is used to determine target bearing and motion, and thus to determine the necessary guidance commands to direct the missile's motion. If the guidance is correct the missile controller will use the seeker information to steer the missile on a trajectory that will intercept the target. HWIL testing simulates this process in a controlled manner in the following way. The front of the missile containing the seeker, i.e. real hardware, is mounted in a cradle that is able to rotate about all three axes. A representative image of a target at a particular range is then projected to the missile seeker to simulate a real target, by means of a target scene generator. The target scene generator is also mounted so that it can be rotated in azimuth and elevation, relative to the seeker, to simulate target motion.

The missile seeker responds to the simulated movement and bearing of the target image and sends data to a missile controller, which then determines appropriate guidance signals to send to other missile sub-systems, such as the actuators for the fins. The overall aerodynamic and kinetic response of the missile to these guidance signals is then modelled, to determine the angular motion to be imposed on the 3-axis cradle, and the effect on the image of the target due to the modelled aerodynamic kinetic response of the missile. Any required changes to the simulated position and motion of the target image are input to the scene generator, which then projects a modified image to the seeker, and then the cycle is repeated. This arrangement is referred to as closed-loop testing, as the consequences of the signals from the missile controller are fed into the target scene generator, which changes the image seen by the seeker and thus the input to the controller, which affects the target scene again, and so on, without operator intervention. Testing is also performed in real-time. The simulated target image grows larger as time progresses, representing the missile's flight towards the target. If the missile is operating correctly the cyclical process allows the complete target engagement to be tested from launch to the point where the missile fuze would be expected to operate. The sub-systems not normally tested by this process are the fuze, the warhead, and the motors.

The target scene generator is a key component of HWIL testing. However, there are currently limitations on the types of seeker that can be tested in this way. In this regard, HWIL systems for testing missiles with optical or infrared seekers typically only test "passive" seekers i.e. where the seeker passively views the radiation emitted by the scene, and does not provide its own radiation to illuminate or floodlight the scene. By contrast "active" seekers contain their own radiation sources to provide scene illumination, and respond only to the wavelengths of those generated sources. Such active seekers based on laser radar include at least one laser source, and detect only laser wavelengths in a selected narrow-band so that the effect of ambient background noise radiation is reduced. The laser source may be carried by a missile or may be a semi-active laser (SAL). In this latter case, the laser emitter may carried by an aircraft or ground personnel and used to illuminate a target for detection by the sensor of the missile.

Testing of such active ladar seekers in HWIL arrangements is not feasible with typical HWIL test equipment, however, because known target scene generators are not capable of generating an image in the format that an active ladar seeker can recognise.

Testing of SAL seekers in HWIL arrangements is similarly not feasible with typical HWIL test equipment. Even though a SAL sensor is 'passive' and does not carry its won laser source, it responds only to pulsed laser radiation, and thus requires a target scene generator that can provide the required laser pulses with the correct timing from the different parts of the SAL's seeker's field of view.

Equipment for HWIL testing of ladar seekers is known to be in development, although such test equipment is typically based on a target scene generated by an array of independent, actively controlled light sources.

SUMMARY OF THE INVENTION

It is an object of the invention to provide a target scene generator for use in testing pulsed laser sensing apparatus for incorporation into flying objects such as missiles.

In a first aspect, the invention provides a target scene generator for generating a target scene, for use in testing pulsed laser sensing apparatus for incorporation in a flying object, the generator comprising an array of pixel elements, detector means for detecting operation of a pulsed laser, light source means for generating at least one pulse of light representing a returned laser pulse, and a reconfigurable optical waveguide network selectively coupling said light source means to said pixel elements, and a controller means being operative to selectively reconfigure said waveguide network, whereby to present to selected pixel elements said one pulse of light and said controller means being operative so that said one pulse of light is provided with selected time delay characteristics such that light emitted from said pixels represent the returned optical signals from a target illuminated by said apparatus.

In a second aspect, the invention provides a method of generating a target scene for testing pulsed laser sensing apparatus that is to be incorporated in a flying object, the method comprising:

detecting operation of a pulsed ladar and providing, in response to said detecting, at least one pulse of light representing a returned laser pulse, providing an array of pixel elements and providing a reconfigurable optical waveguide network selectively coupling said at least one pulse of light to selected ones of said pixel elements for emission therefrom, and providing said one pulse with selected time delay characteristics such that light emitted from said pixels represents the returned optical signals from a target illuminated by said apparatus.

The sensing apparatus that may be tested by the present invention may be active pulsed laser sensing apparatus in which a laser emitter and receiver are carried by the same flying object. Alternatively, the apparatus may be semi-active (SAL) in which a laser emitter is separate from the flying object which carries the receiver. In this latter case, the emitter may be located on the ground or on another flying object, such as an aircraft. As described herein references are made predominantly to pulsed ladar sensors, but it will be appreciated that the invention is also applicable to SAL type sensors.

The present invention provides a practical solution to the problem of testing pulsed ladar sensors forming an active or SAL seeker for incorporation in a missile, or other flying objects.

The reconfigurable optical waveguide network may comprise a plurality of optical waveguides for directing light emitted from the light source means to any one or more of the plurality of pixel elements in the pixel array and at least one switching element for selectively directing light emitted from said light source means along any one or more of the optical waveguides in accordance with a target image to be generated.

The pixel elements may be formed by respective ends or optical elements at the respective ends of the optical waveguides such that light emitted from the light source means can be directed along the waveguides to the pixel elements for forming a target image.

Advantageously, the light source means may comprise a single laser source and the optical waveguide network can be reconfigured for directing light emitted from said laser source to any one or more of the pixel elements in the pixel array.

The optical waveguide network may be composed wholly or mainly of optical fibres, which may easily be configured in complex networks. However, selected parts of the network may be formed of other types of optical waveguide, for example light propagation paths formed on substrates.

Accordingly, complex and rapidly changing target scenes may be simulated by a target scene generator including only one laser source and only one photodetector and a relatively inexpensive and compact waveguide network.

The pixel elements may be formed by ends of optical fibres (or other waveguide) arranged in a matrix. Alternatively, each pixel element may include a light transmissive element such as a lens, positioned at the end of a waveguide.

There are various types of ladar, such as spot-scanned, line-scanned or staring. In spot-scanning, a laser spot is transmitted to scan a target scene (field of view) in a raster scan pattern in order to build up an image. In line scanning, the laser beam forms a line which traverses the target scene. In staring ladar, the entire target scene is simultaneously illuminated. For instance, if a ladar under test is a staring ladar, a target scene generator is adapted to receive a single burst of light from the ladar and transmit a simulated return from a target accordingly.

Further, a Ladar may be coaxial or biaxial. In a coaxial system, the transmitter and receiver optical paths share the same aperture and the same optical axis. In a biaxial system, the transmitter and receiver optical paths are physically separated.

The target scene generators as described herein with reference to the drawings may be adapted to work with one or more of these different types of ladar. The flexibility of the target scene generator described herein also allows simulation of any one or more of various types of target. In order to accommodate different types of ladar and simulate different types of target, the target scene generator is required to be adaptable in the way light is received and transmitted.

As regards received light from the ladar under test it is necessary to ensure that light emitted by a ladar that is incident on the pixel array is detected by transmission through the fibre network. For a biaxial system having a separate transmission path, detection may take place remote from the pixel array. In some circumstances, the target scene generator may respond to a triggering of the pulsed ladar, rather than the actual emission of light, if emission is not to take place e.g. for safety reasons.

For light transmitted back to the ladar by the target scene generator, it is necessary to simulate light reflected from a real target. This is effected by illuminating selected pixels, to simulate line of sight direction, and to provide the light pulses with selected time delay characteristics to simulate range.

As preferred for simplicity and expense, said detector means comprises a single photodetector, or a small number of photodetectors, and said light source means comprise a single laser source or a bank of a small number of lasers, where the number of lasers or detectors is less than the number of pixel elements. In some circumstances the light source means may comprise a mirror or retroreflector.

It may, in principle, be possible to conceive of various types of reconfigurable network, which meet the above described requirements for flexibility, so that laser pulses are selectively directed to selected ones of said pixels. The elements of the generator array should be individually controllable, to be able to generate a random scene of target types, although only one pixel projector element needs to be illuminated at a time to be able to simulate a spot-scanned Ladar (assuming that the transmitter beam divergence is not larger than the angle subtended by the projector element). Nevertheless, the number of variants of network path required will be enormous, even for a single target type and a single engagement geometry. Ideally the generator pixel elements should be reconfigurable within the timescales associated with actual target or platform motion.

In these circumstances and in accordance with the invention, it is preferred to provide in said waveguide network an optical switch for selectively coupling a large number of inputs to a large number of outputs. This provides very great flexibility in providing light paths to said pixel elements, and allows reconfiguring within very short time periods. Conveniently the optical switch is a MEMS device such as an array of micro mirrors, each mirror selectively directing input light to selected outputs.

Such a target scene generator may provide light for emission by a selected number of pixels, either simultaneously or in sequence, depending on whether the ladar sensor under test is staring, line-scanned or spot-scanned.

Time delays representing range may be generated principally by electronically adjusting timing of light pulses from said light means of the target image generator, although time delays can also be generated within the waveguide network by appropriate selection of output path and associated time delay.

In addition, selective routing may take place in the network to provide light emitted from more than one pixel, such that different pixels emit light with different time delays to represent either return signals from different parts of an object that are at slightly different ranges, or return signals from different targets at different ranges. That is, the different delays introduced by the network represent variations in signal time delay within a scene. Delays may be incorporated into the network by selected lengths of optical fibre; alternatively other time delay devices may be provided.

To simulate, for example, pulse spreading due to target depth, in addition to time delay, the amplitude or intensity of the output pulse may be modified and the shape of an output pulse may be modified as by lengthening the pulse, and changing its shape. Target depth here refers to the extent of a surface along the line of sight that is illuminated by the incident laser pulse, so that a target surface that is normal to the line of sight will have zero depth, and a target surface that is inclined at an angle to the line of sight will have finite depth. Attenuator devices may be provided for modifying pulse amplitude. Combinations of delay paths may be provided for modifying pulse shape.

A preferred form of the present invention provides the following features:

A target scene generator for Hardware In The Loop testing of guided missiles incorporating ladar seekers that send information back to the ladar under test in a format suitable for simulating a target image for the ladar seeker. This simulated target information is to be in the form of optical pulses of the correct width and at the correct positions in the field of view.

Returned optical pulses at the correct time delay to represent target range, and the correct distortion to the pulse shape if there is any pulse spreading due to, for example, target depth or atmospheric phenomena.

The position and timing of these optical pulses in the field of view are changed as the engagement proceeds.

In addition if the seeker is staring or line scanned, optical pulses may be expected from more than one point in the field of view from the same transmitted pulse, either from an extended target or from multiple targets. In this case there is the correct relative time delay between the pulses. The pulses may be emitted from the generator simultaneously or in sequence, corresponding to a scanned input from a ladar under test.

BRIEF DESCRIPTION OF THE DRAWINGS

In order that the present invention may be well understood, embodiments thereof, which are given by way of example only, will now be described with reference to the accompanying drawings wherein.

DETAILED DESCRIPTION OF THE DRAWINGS

Figure 1:
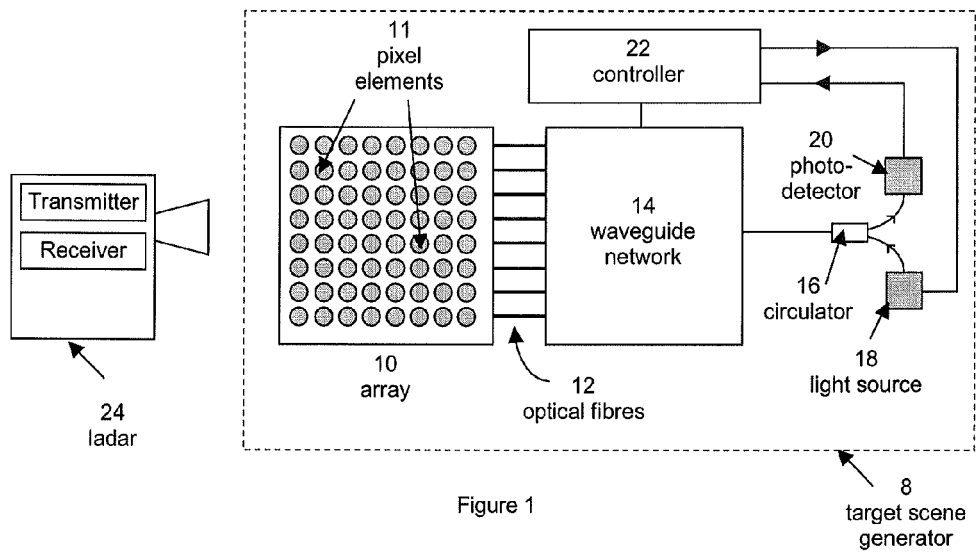
FIG. 1 is a schematic diagram of a target scene generator for testing a ladar.

Referring to FIG. 1, a target scene generator 8 is shown which comprises an array 10 of pixel elements 11. There are 8×8 pixel elements as shown, although more or less pixel elements may be used. A reconfigurable network of optical waveguides 14 selectively couples a light source 18 to the pixel elements so that light emitting from the light source can be projected at a selected pixel element or elements. The light source is typically a source of laser radiation, hereinafter referred to as a laser.

Network 14 is coupled by a light splitter, or circulator 16 to the laser light source 18 and a photodetector 20. Detector 20 receives light transmitted from a transmitter of a ladar 24 under test and transmits electrical signals to an electronic controller 22 according to the light received. Controller 22 provides electrical control signals to laser light source 18 for activating the array of pixel elements 10 for projecting a simulated target image to the ladar 24 under test.

The array 10 can project simulated return signals from one or more targets within the ladar's field of view, the output of the array providing the input to a ladar receiver under test. The ladar may contain a receiver with a single-element photodetector, for which its transmitter laser would be scanned if generating an image, or it might contain a staring receiver, with an array of parallel imaging detector channels.

The array 10 is capable of generating output pulses matching the pulsewidth of the transmitter, which may be of the order of nanoseconds. The target scene generator 8 can be adapted to provide variation in the pulse widths and pulse shapes that are projected, both to accommodate different types of transmitters and to allow simulation of pulse-stretching effects such as due to target depth.

The timing of the projected pulses is controllable to simulate target range and range changes. Ideally the range would be controlled to a resolution comparable to ladar receiver digitisation circuits, which may be a fraction of a nanosecond, although a lower resolution corresponding to the transmitter pulse length may be adequate.

The pixel elements 11 of array 10 are individually controllable by reconfiguration of the waveguide network to connect any one or more pixels with the light source. In this way, the array is able to generate any one of multiple different possible scenes, although only one pixel element 11 may need to be illuminated at a time to be able to simulate a spot-scanned ladar (if the transmitter beam divergence is not larger than the angle subtended by the projector element). The pixel elements are reconfigurable within the timescales associated with actual target motion.

The target scene generator is capable of testing ladar of a co-axial type with a shared transmitter/receiver line of sight or bi-axial with separate channels for transmit and receive. The return signals from the projector array may be triggered by the trigger signal applied to the transmitter of the ladar. Since co-axial Ladar may be tested the projector should be able to cope with input signals as well.

Referring now in more detail to the target scene generator shown in FIG. 1, the array 10 comprises the ends of an array of optical fibres 12. The optical fibre ends may incorporate lens elements such as collimating lens elements (not shown). The other ends of the optical fibres are connected to the waveguide network 14 which in this example comprises a switchable fibre network (note that not all the fibre links are shown). The network 14 contains optical switches that can reconfigure the internal light paths to determine which pixel elements of the generator array are illuminated. In an example of network 14, (described in more detail below with reference to FIGS. 2 and 3), the path of light through the network can be reconfigured as required to control the delay between emission of light from light source 18 and illumination of respective pixel elements. Suitable switching can for example be achieved in a compact form using 3-D MEMS optical switches using movable micromirrors. Details of such suitable multi-channel devices can be found at www.calient.net, and www.glimmerglass.com.

In the present arrangement, a switching arrangement, for example a MEMS system, may be adopted comprising a plurality of moveable elements, or micro-mirrors, for directing light from the light source from one part of the waveguide network to another part of the waveguide network so that the network of waveguides can be reconfigured for directing light from a light source to any one or more of a plurality of pixels in the pixel array. For example, a first switchable element may be operated to direct light from the light source to propagate internally along a selected one of a plurality of optical fibres. Subsequently, light from the first selected optical fibre may be coupled into a second selected optical fibre by operation of a second switchable element. The end of a final selected optical fibre may constitute a pixel in the pixel array. The reconfigurable arrangement allows light from just a single light source to be directed to any of the pixel elements by selective switching of the switchable elements in accordance with a required target image to be displayed to a ladar.

In known MEMS systems, a MEMS device acts as a projector for projecting light from multiple light sources in free space to a display screen for displaying an image.

Glimmerglass provides optical switch networks of 190 inputs and outputs and Calient provides switch networks of 320 inputs and outputs. These devices are switchable in timescales of the order of 10 ms, allowing a 100 Hz update rate on reconfiguring the switch network. The volume associated with the switch network is in the region of 40 litres for a 320 input/output device, although such a network is connected to the target scene generator by a flexible optical fibre array 12, as shown in FIG. 1. The output fibre array of pixel elements itself is small and light and could potentially be used in a dynamic testing environment.

In addition other optical switch technologies (for example solid state devices such as thermo-optic switches) are also under development for telecommunications applications that promise faster switching times and reduced volumes in the future.

Controller 22 holds an electronic representation of the target to be imaged, and controls the switchable fibre network 14 to simulate reflections of an input light pulse from a target, the reflections comprising output pulses from laser 18 transmitted through network 14 and array 10. The controller controls emission of light from the light source 18.

The controller 22 is programmed prior to testing according to the type of ladar under test. In spot-scanning ladar, a laser spot is transmitted to scan a target scene in a raster scan pattern. The controller 22 reconfigures the network 14 so that the array 10 projects a returned optical signal in response to each laser spot transmitted from the ladar.

The output signal from the target scene generator is generated by the laser source 18. The laser light source may comprise a single fibre-coupled source which can be any suitable fast-pulse emitter appropriate to the ladar under test, such as a microchip laser. Alternatively, the light source 18 may comprise different lasers for emitting light at different wavelengths and with different pulse shapes, appropriate to the ladar under test, as long as the wavelengths emitted are within the pass-band of the fibre and can be coupled into it. The light source 18 may comprise more than one laser for emitting light simultaneously within the target scene generator with both laser signals coupled together before being injected into the switchable network 14. This would allow both CW and pulsed projector emissions to be generated, for example, as might be required for simulating the effects of a directed energy weapon dazzle counter measure to the ladar.

In known system, an array of a large numbers of lasers is used for generating an image. The large number of lasers illuminate a ladar under test and are in many senses equivalent to the pixel array of the illustrated embodiment. The present arrangement comprises a reconfigurable network having an array of passive optical waveguides which can guide light from a single laser source to any one or more of the plurality of pixels in the pixel array. Although more than one laser source may be provided for generating a plurality of different target images, as the present arrangement may provide just a single laser light source it can readily be replaced by or combined with one or more laser sources having different characteristics (e.g. wavelengths, power levels or pulse characteristics) in order to simulate different testing environments and different ladars. In a preferred arrangement, if more than one laser source is used for injecting light into the waveguide network, it is injected at a single location of the network and controlled to propagate along selected waveguides for illuminating the pixel elements required for generating a desired target image. Conversely, the known system would require replace of many lasers at great time and expense.

In other known systems, a plurality of laser sources is fibre-coupled to respective detector elements of a ladar under test. This known arrangement does not generate a target image but instead provides an input to selected detector elements in order to simulate returned laser signals from a target. The time taken to set up this known system is prohibitive and it can not readily be used to test multiple ladars one after another.

For testing co-axial ladar, the light source 18 may comprise a mirror or retro reflector in order to recreate unusual pulse shapes. This may be of use, for example, for ladars containing a Doppler measurement element where the transmitter pulse shape may not be simple and may contain both short-pulse and long-pulse components. A mirror may be used to reflect the transmitter pulse shape, combined with a suitable variable and programmable in-line optical delay to simulate target range. In this case, the in-line delay is preferably variable from zero to the equivalent maximum engagement range being simulated.

In order to simulate target range, a delay is required between the target scene generator receiving light from the ladar and transmitting returned light to the ladar. A longer delay equates to a longer range between the ladar and the target. In a reflective type target scene generator, the generator typically comprises a light path which provides a time delay equivalent to the sum of the range from the ladar to the generator and from the generator to the ladar. The use of light source 18 in the illustrated target scene generator means that the switchable fibre network is not required to comprise delay paths corresponding to the target range, as this delay can be introduced by controlling the trigger timing applied to the light source (i.e. the light source emits light at a determined time delay after receiving light from the ladar in order to simulate the time taken for light to travel from and to the ladar under test).

The detector 20 is a high band-width photodetector matched to the laser emitter 18, using either a fused fibre coupler or fibre circulator 16 to join the paths. This detector triggers the controller to respond to laser pulses input to the projector from the ladar transmitter under test, if using a co-axial system. An additional separate photodetector can be used to monitor the output of the transmitter from a bi-axial ladar (not shown).

Flexibility and reconfigurability of the target scene generator 8 is implemented by the switchable fibre network 14 controlled by controller 22. The network 14 may comprise switchable optical fibres arranged in patch-panels with 64 inputs and outputs controlled by controller 22. Such network devices are commercially available with opto-mechanical switching and capable of broadcasting one input signal to any of N outputs.

Although a pixel element array 10 is shown with 8×8 pixel elements, an array with a greater number of pixel elements could be realised. Such an array may comprise combinations of the pixel array shown, either cascaded with single laser source, or in parallel with multiple laser sources.

A switch network that incorporated only the previously referenced exemplary Glimmerglass or Calient switches would be sufficient to simulate the return from a spot scanned ladar viewing simple targets without pulse spreading where only one element of the projector array needs to be illuminated at any one time with the controller determining the required delay time on triggering the laser emitter. With this approach, a model of the scan pattern utilised by the ladar transmitter is included in the controller 22.

If more than one pixel element is to be illuminated simultaneously such as for a staring imaging ladar, or if pulse spreading effects such as target depth are to be included, then greater sophistication in the switch network is required, as explained in more detail below with reference to FIGS. 2 and 3, in which two or more stages of optical switch network are shown.

In the FIG. 1 embodiment, the emission of light from light source 18 is delayed to simulate target range. The examples shown in FIGS. 2 and 3 can additionally simulate target depth by introducing a delay between the emission of light from the light source and the transmission of light from respective pixel elements in array 10.

For instance, a target which is a ground vehicle may have a depth of seven metres. A switching network 14 as shown in FIGS. 2 and 3 may include selectable delay paths corresponding to pulse spreading due to target depth for a spot-scanned system, or variations in range across a scene, for a line-scanned or staring system, if these are greater. In order to simulate the depth of the ground vehicle where a ladar transmits light to eight locations on the ground vehicle at progressively greater depth, a progressively longer delay would be required and therefore the optical paths become progressively longer. Accordingly, the respective optical paths are separated by an optical path difference in air of 1 m to simulate a depth of 7 m which requires a total length of about 36 m of fibre, i.e. [arithmetic sum of (k*1 m), from k=0 to k=number of delay settings−1]/(glass refractive index, n=1.5)*2.

In more detail, the optical waveguide network 14 is capable of processing light emitted from the light source 18 and projected by array 10 for simulating multiple targets at different ranges, target depth, and variable attenuation of signals due to, for example, changes in range or target surface characteristics.

Figure 2:
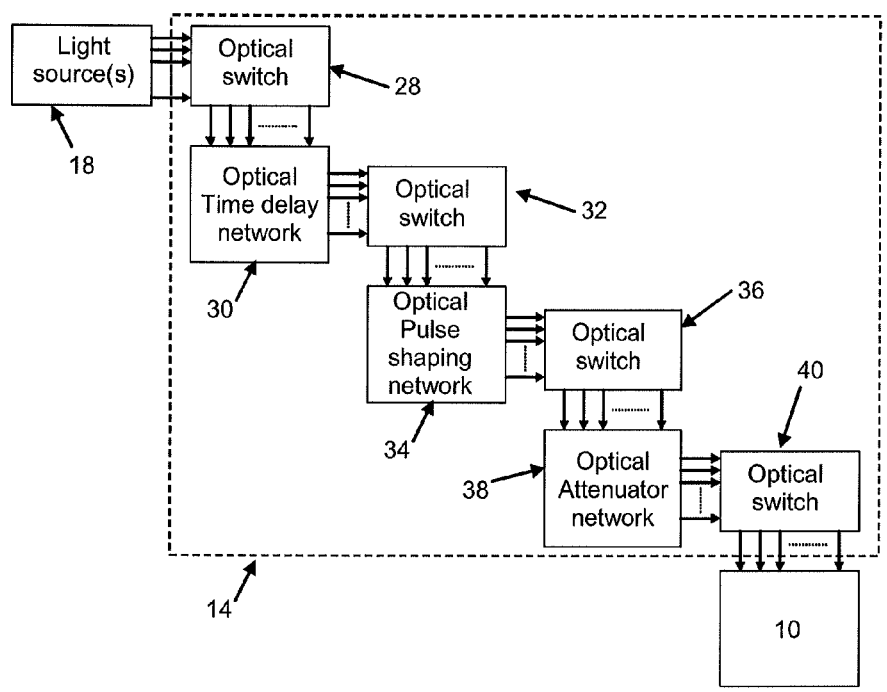
FIG. 2 shows an example optical waveguide network of the target scene generator shown in FIG. 1.
Figure 3:
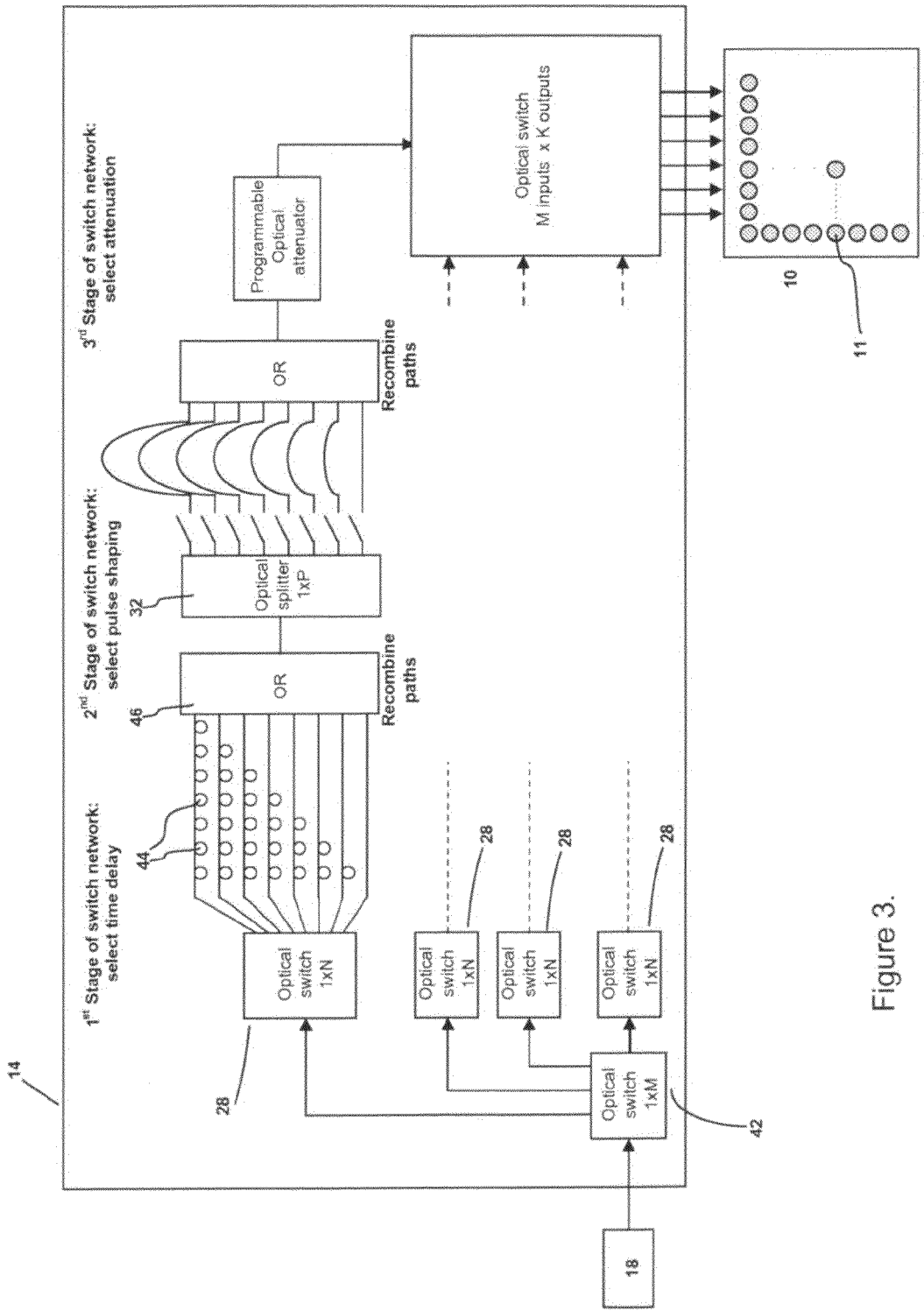
FIG. 3 shows an example in which the optical waveguide network in FIG. 2 can be put into operation.

The target scene generator shown in part in FIGS. 2 and 3 has similar features to those shown in FIG. 1, some of which are omitted for brevity.

In FIG. 2 the light from light source 18 can be selectively coupled to the array 10 of pixel elements 11 by optical wave guide network 14. The light from the light source is passed through three stages in network 14 in order to simulate different target effects or process the light as required.

The light source 18 may contain one or more lasers connected for transmission to Network 14, although more than one light source would be required in the presence of directed energy weapons or countermeasures. Network 14 comprises a first optical switch unit 28 which transmits light to a time delay unit 30. The first optical switch unit selects the path through the delay unit for the appropriate delay in accordance with a control signal received from the controller 22. The different delay paths may correspond, for example, to different lengths of optical fibres.

The output of the time delay unit is then input via a second optical switch 32 unit to a pulse-shaping unit 34. The switch unit 32 selects the appropriate path for the relevant pulse shaping. Pulse shaping techniques are described in the applicant/assignees U.S. Pat. No. 7,068,424 on 'Multiple Pulse Generation, the contents of which are hereby incorporated.

The output of the pulse-shaping unit 34 is then input via a third optical switch unit 36 to an attenuator unit 38, for selection of the appropriate degree of attenuation. The attenuation unit 38 may use, for example, programmable in-line optical fibre attenuators such as those commercially available from Anritsu, Hewlett Packard and JDS Uniphase.

The output of the attenuator unit 38 can then be passed to the appropriate pixel elements 11 on the array 10, via a fourth optical switching unit 40 that selects the correct (x,y) co-ordinate for the appropriate pixel element 11.

Each of the time delay, pulse shaping and attenuation units 30, 34, 38 may comprise a specific component associated with an individual pixel element 11 in the array 10 for processing optical signals transmitted by that pixel element. Accordingly, for an array comprising N×M pixel elements 11, N×M components would be required, so that each pixel is capable of being operated independently. Alternatively, a single such component can be associated with more than one pixel element 11 such that optical signals transmitted by more than one pixel element can be processed by shared components. The latter arrangement is preferable from a cost, size and efficiency perspective.

An example of the optical waveguide network 14 in operation is shown in FIG. 3.

In the functional arrangement shown in FIG. 3, the light source 18 is input to a (1×M) optical switch 42 that is capable of multicast distribution of the input optical signal between up to M different output paths. The M different paths represent up to M pixel elements 11 in the pixel element array 10 that are to be illuminated in each image frame. The embodiment in FIG. 3 shows M=4, although this is for example only. More than one laser source may be required for line-scanning or staring ladars or to compensate if the switching network requires operation at a relatively slow frame rate.

Only one pixel element per frame may need to be illuminated if the ladar under test is of the spot-scanned type, in which case M may be 1, if the controller 22 in FIG. 1 is able to reconfigure the switch network 14 within the frame interval. Alternatively, if more time is needed to reconfigure the switch network 14 than the frame interval would allow, multiple paths can be utilised, i.e. M>1, with each path then generating the optical signals for one frame of ladar data. The required update rate for the information in each frame is then reduced by a factor of (1/M). This approach is applicable to line-scanned and staring ladar sensors, as well as spot-scanned, where M may be greater than the number of elements 11 in the pixel element array 10 to be illuminated per frame.

The optical signal in each of the M paths is then provided to the first stage of the optical switch network 14, although only one complete path is shown in FIG. 3 for clarity, the remaining paths being indicated by dotted lines. The first stage of the network in FIG. 3 selects the time delay on the path, relative to the other M paths, in order to simulate target depth. If a spot-scanned ladar is being tested then this stage may not be necessary. A 1×N optical switch is used to select one of N output paths, each with a different time delay. The different time delays are represented in FIG. 3 by different numbers of optical fibre loops 44.

In a line-scanned or staring ladar, the first stage of the optical switch network is used to simulate multiple targets at multiple ranges during a single pulse from the ladar. That is, one or more pixel elements 11 in the array may simulate a first target at a first range (and first time delay) and one or more other pixel elements 11 in the array may simulate a second target at a second range (and second time delay). Alternatively, different pixel elements 11 in the array may simulate return signals from a single target, but from portions of the target at different ranges.

The outputs from the first stage are recombined by a path recombination unit 46 for input to the second stage of the fibre network, which selects the temporal pulse shape. Pulse shaping may be required to simulate certain characteristics of a simulated target. For instance, when a target is inclined to the line of sight different portions of the target are simultaneously at different ranges from the ladar. When such a target is illuminated by a laser beam of finite extent, the pulse duration is stretched. In addition, the amplitude (peak power) of the pulse is decreased, since the pulse energy is constant.

In FIG. 3, the pulse shaping stage comprises an optical splitter to distribute the optical signal between different paths with different time delays, with optical switches that are opened or closed depending on whether each path is to contribute to the final pulse shape. As an alternative to an optical splitter, an optical switch with multicast capability could be adopted or multiple individual switches. The second stage of the network comprises a 1xP splitter to be used, with P different possible portions of the pulse shape. Alternatively, an N×P optical switch could be utilised, which would replace the 1xP optical splitter 32 and the path recombination unit 46 at the end of the first stage.

The output of the pulse shaping network is the sum of paths with different delays, depending on how much target depth is present, and consequently how much pulse stretching is required. If there is no pulse stretching, for example, then the signal is sent along a path with no delay, if using a multicast switch. Alternatively, only the zero delay path switch is closed, if using a splitter and individual switches.

The different portions of the pulse shape at the outputs of the second stage are recombined by a recombination unit 48, which may be a multiplexor, for input to the third stage, which comprises a optical attenuator 38, for example a programmable optical attenuator. Attenuation of the optical signals allows simulation of changes in signal amplitude due to changes in range. The output of the attenuator 38 provides an input to an M×K optical switch 40, where there are M inputs and K outputs, with K corresponding to the number of pixel elements 11 in the pixel element array 10.

The pixel element array 10 shown in FIG. 3 may be a portion of a larger pixel element array, with each portion responsive to a laser source 18 and an optical switch network 14. The M×K optical switch 40 directs M optical signals with the correct relative time delay, the correct pulse shape and the correct level of attenuation to the selected (x,y) co-ordinates in the pixel element array 10, which provides illumination to the ladar under test.

Larger pixel element array sizes may require more than one switch array to maintain flexibility. The physical switch volumes involved with this approach will eventually place limits on the size of the projector array that could feasibly be managed, although it is expected that future MEMS optical switches will incorporate larger numbers of channels in smaller formats.

The volume of the optical switches, optical attenuator, optical fibre, plus the connectors and couplers (not shown) required to operatively connect all the components together, contribute to the total volume of the equipment. Such components can be located remotely to the pixel element array 10, which would be the only component mounted in front of the ladar under test.

The invention claimed is:

1. A target scene generator for generating a target image, for use in testing pulsed laser sensing apparatus for incorporation in a flying object, the generator comprising:

an array of pixel elements, a detector for detecting operation of a pulsed laser, a light source for generating at least one pulse of light representing a returned laser pulse, and a reconfigurable optical waveguide network selectively coupling said light source to respective said pixel elements, and a controller being operative to selectively reconfigure said waveguide network, whereby to present to selected pixel elements as said at least one pulse of light and said controller being operative so that said one pulse is provided with selected time delay characteristics such that light emitted from said pixel elements represent the returned optical signals from a target illuminated by said apparatus.

2. A generator as claimed in claim 1, wherein the reconfigurable optical waveguide network comprises a plurality of optical waveguides for directing light emitted from the light source to any one or more of the plurality of pixel elements in the pixel array and at least one switching element for selectively directing light emitted from said light source along any one or more of the optical waveguides in accordance with a target image to be generated.

3. A generator as claimed in claim 2, wherein the pixel elements are formed by respective ends of optical elements or at the respective ends of the optical waveguides such that light emitted from the light source can be directed along the waveguides to the pixel elements for forming a target image.

4. A generator as claimed in claim 1, wherein the optical waveguides are optical fibres.

5. A generator as claimed in claim 1, wherein the light source comprises a single laser source and the optical waveguide network can be reconfigured for directing light emitted from said laser source to any one or more of the pixel elements in the pixel array.

6. A generator as claimed in claim 1, wherein said waveguide network is reconfigurable such that the optical path to each pixel element of said array is individually controllable for controlling emission of light.

7. A generator as claimed in claim 6, wherein said network includes a plurality of reconfigurable optical switches having multiple inputs that can be selectively connected to multiple outputs.

8. A generator as claimed in claim 7, wherein said switches are reconfigurable for outputting any input thereto to any one of a plurality of outputs.

9. A generator as claimed in claim 1, wherein said light source comprises a mirror or a retroreflector.

10. A generator as claimed in claim 1, wherein said light source comprises a plurality of laser devices of differing wavelengths and/or pulse shapes.

11. A generator as claimed in claim 1, wherein said laser source is arranged for simulating dazzle counter-measure effects.

12. A generator as claimed in claim 1, wherein target range is simulated by said controller controlling time of pulse emission of said light source.

13. A generator as claimed in claim 12, including a plurality of delay elements in said waveguide network providing differing delays, said controller being arranged to selectively incorporate the delay elements in light paths to each pixel element from said laser source, to represent pulse spreading effects or variations in signal time delay within a scene.

14. A generator as claimed in claim 13, wherein said delay elements comprise lengths of optical fibre.

15. A generator as claimed in claim 14, including a switching element for selectively coupling light from the light source along any one of a plurality of said delay elements.

16. A generator as claimed in claim 15, including a multiplexor for coupling said plurality of delay elements to each pixel element.

17. A generator as claimed in claim 1, wherein the controller is configured for controlling pulse amplitude of light directed to any one or more of the pixel elements.

18. A generator as claimed in claim 1, including an attenuator of selectable value for controlling pulse amplitude light directed to any one or more of the pixel elements.

19. A generator as claimed in claim 1, wherein said controller is configured for controlling the pulse length of light directed to any one or more of the pixel elements.

20. A method of generating a target image for use in testing pulsed laser sensing apparatus that is incorporated in a flying object, the method comprising:
    detecting operation of the apparatus and providing in response to said detecting at least one pulse of light representing a returned laser pulse,
    providing an array of pixel elements and providing a reconfigurable optical waveguide network selectively coupling said at least one pulse of light to selected ones of said pixel elements for emission therefrom, and
    providing said one pulse with selected time delay characteristics such that light emitted from said pixels represents an image of a target illuminated by said apparatus.

21. A method as claimed in claim 20, wherein the light path in said network to each pixel element is individually controlled.

22. A method as claimed in claim 20, including a first stage of providing a selected light path to a first pixel for a said light pulse, and a second stage of selecting a time delay for the selected light path.

23. A method as claimed in 20, including controlling selected parameters of said one pulse of light.

* * * * *